United States Patent [19]
Antoniotti et al.

[11] 4,320,833
[45] Mar. 23, 1982

[54] CARTRIDGE FOR A VIDEO-DISK, AND VIDEO-DISK SUITABLE FOR SUCH A CARTRIDGE

[75] Inventors: Pierre Antoniotti; Alain Matge; Philippe Guillon, all of Paris, France

[73] Assignee: Thomson-CSF, Paris, France

[21] Appl. No.: 196,565

[22] Filed: Oct. 14, 1980

Related U.S. Application Data

[63] Continuation of Ser. No. 14,902, Feb. 23, 1979, abandoned.

[30] Foreign Application Priority Data

Feb. 24, 1978 [FR] France ................................ 78 05338

[51] Int. Cl.³ .............................................. B65D 85/57
[52] U.S. Cl. .................................... 206/309; 206/350; 206/818; 369/270; 369/287; 369/289; 369/291; 360/133

[58] Field of Search ................... 274/1 R, 9 B, 42 R; 206/309, 310, 311, 312, 313, 350, 818, 414; 360/133; 358/128.5, 128.6; 179/100.1 G; 369/272, 273, 274, 282, 287, 291

[56] References Cited

U.S. PATENT DOCUMENTS

| | | | |
|---|---|---|---|
| 2,806,704 | 9/1957 | Burdett | 274/42 R |
| 3,109,539 | 11/1963 | Turoff | 206/310 |
| 3,224,573 | 12/1965 | Way | 206/313 |
| 3,250,537 | 5/1966 | Henry et al. | 274/42 R |
| 3,951,264 | 4/1976 | Heidecker et al. | 206/309 |
| 4,013,169 | 3/1977 | Cheney | 206/444 |
| 4,061,341 | 12/1977 | Kaplan | 274/1 R |

*Primary Examiner*—John W. Shepperd
*Attorney, Agent, or Firm*—Cushman, Darby & Cushman

[57] ABSTRACT

A cartridge for enclosing a video-disc, which comprises a sleeve and a tray. The video-disc is located into a cavity hollowed in the tray and secured to the bottom of this cavity along a circular central zone through the medium of a plurality of magnetic patches glued to it and attracted by a circular magnet embedded in the bottom of the cavity.

9 Claims, 4 Drawing Figures

RECORDED FACE

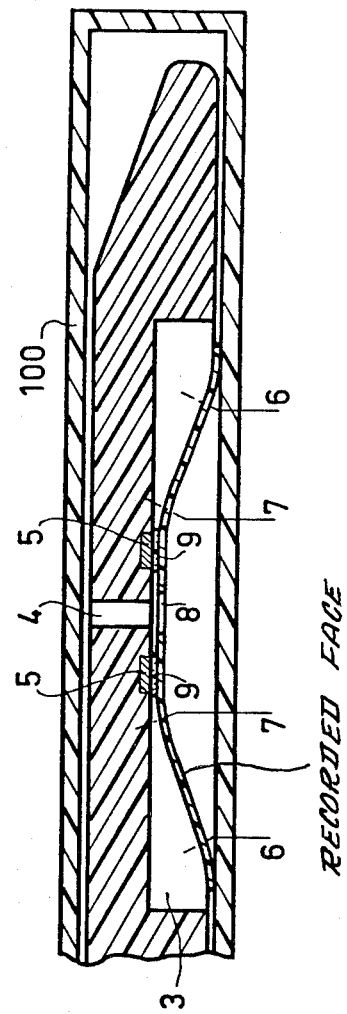

CARTRIDGE FOR A VIDEO-DISK, AND VIDEO-DISK SUITABLE FOR SUCH A CARTRIDGE

This is a continuation, of application Ser. No. 14,902 filed Feb. 23, 1979, now abandoned.

The present invention relates to cartridges for video-disks that enable the video-disks to be stored and handled while protected from deterioration of various kinds. It also relates to the video-disks suitable for being stored in such a cartridge.

The generic term of video-disk is known to be given to high density information media enabling signals, that most usually represent a television programme, to be recorded and read—usually optically. It has also been proposed to use such video-disks to record, among others, numeric information to be used in data processing systems.

The items of information on the disks have dimensions in the order of one micron and it is therefore important to take all possible measures to prevent any object from rubbing on the surface of the disk carrying said items of information, and even any contact at all.

In the case of a flexible or floppy disk, used in several processes for reasons of aerodynamic stabilisation, it is not possible to handle this disk by the edge, as with rigid disks and this is a reason for designing, for routine use of the system, a cartridge enabling the disk not only to be stored but introduced into and withdrawn from the reader without being touched by hand.

In a system at present on the market using a mechanical reading system, the disk is contained in a flexible paper sleeve. This sleeve is introduced into the reader and a mechanism comprising rollers extracts the disk and directs it to a reading table. This flexible sleeve affords little protection to the disk and the extraction mechanism bears on the recorded face, thus sooner or later damaging it.

French Pat. No. 2,324,089 filed on Sept. 11th, 1975 by the applicant describes a cartridge containing a rigid sleeve containing a rigid drawer, itself bearing the video-disk. The cartridge is inserted into the reader where the drawer is locked by pins; then, the sleeve is withdrawn while the drawer is still maintained in the reader. In a final stage, the disk is drawn upwards against a pre-stabilizer, with reading taking place optically through the pre-stabilizer.

A variant of this sytem is described in French Pat. No. 2,353,924 filed on June 4th, 1976 by the applicant. In this system, the sleeve containing the rigid drawer is flexible and is drawn into the body of the reader, where it remains stored during reading.

In order, among other things, to prevent the recorded face from rubbing against the pre-stabilizer, a cartridge described in French Pat. No. 2,396,380 filed by the applicant on July 1st, 1977, has been designed. This cartridge includes a tray which, itself, forms the pre-stabilizer and on which the non-recorded side of the disk rests. This tray is covered by a top, the disk being applied thereto by means of retaining rings. A cartridge of this type is, however, costly on account of the precision required for the said tray and the need to construct the top of moulded material.

In accordance with the present invention, there is provided a cartridge for enclosing a video-disc, which comprises:
a sleeve;
a tray for being placed into said sleeve; said tray having a cavity for containing the video-disc and means for attracting a central portion of the video-disc.

For a better understanding of the invention, and to show how the same may be carried into effect, reference will be made to the ensuing description and to the attached figures among which:

FIG. 4 shows a sectional view of a cartridge with a video-disc therein.

Figure 1:
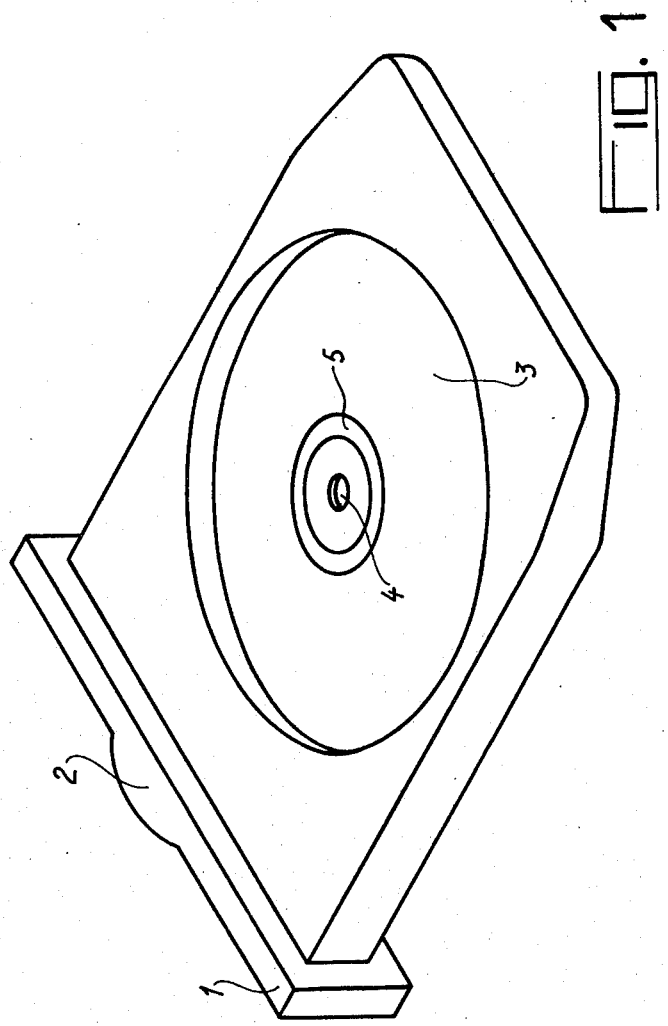
FIG. 1 illustrates the tray of a cartridge according to the invention.

The cartridge includes, in a rectangular sleeve 100 of cardboard backed with paper, a tray moulded from a material causing a minimum of static electricity, polyamide 6.6. for example, and represented in FIG. 1.

This tray has the shape of a rectangular plate the thickness of which has been magnified deliberately in the Fig. to facilitate illustration and which ends on the rear part (at the rear in the Fig.) in a shoulder 1 whose thickness is substantially the same as that of the walls of the sleeve 100. This shoulder comes into abutment with the open extremity of the sleeve 100 and prevents the tray from completely penetrating this sleeve; in this way, a rounded pull-out member 2 is kept clear; the lower face of this member (hidden in the Fig.) is provided with a triangular recess permitting the attachment of an extracting nipple fixed to the reader. The front side of the plate is shaped so as to facilitate its insertion into the sleeve.

A circular cavity 3 is provided in the upper face of the plate to house the video-disk. The diameter of this cavity is slightly greater than that of the disk. There is a central hole 4 to receive the drive spindle of the disk when the cartridge is placed in the reader.

If the cartridge were confined to the means described hitherto, the disk would float freely in the cavity 3 because it is necessary to provide radial clearance, even if minimal, and its recorded face could come into contact with the inside of the sleeve and rub against it, which would cause severe damage to the recording.

To prevent this firction, a circular groove has been provided in the bottom of cavity 3, this groove being concentric thereto and to the central hole, and a multipolar magnet 5 in the shape of a ring has been placed in said groove. This magnet is, for example, cut out of a sheet of rubber filled with magnetic material and then magnetized with a series of north and south poles alternately. It is advisable to provide for the magnet to project slightly in relation to the plane of the bottom of cavity 3 in order to ensure that the disk is properly attracted.

Figure 2:
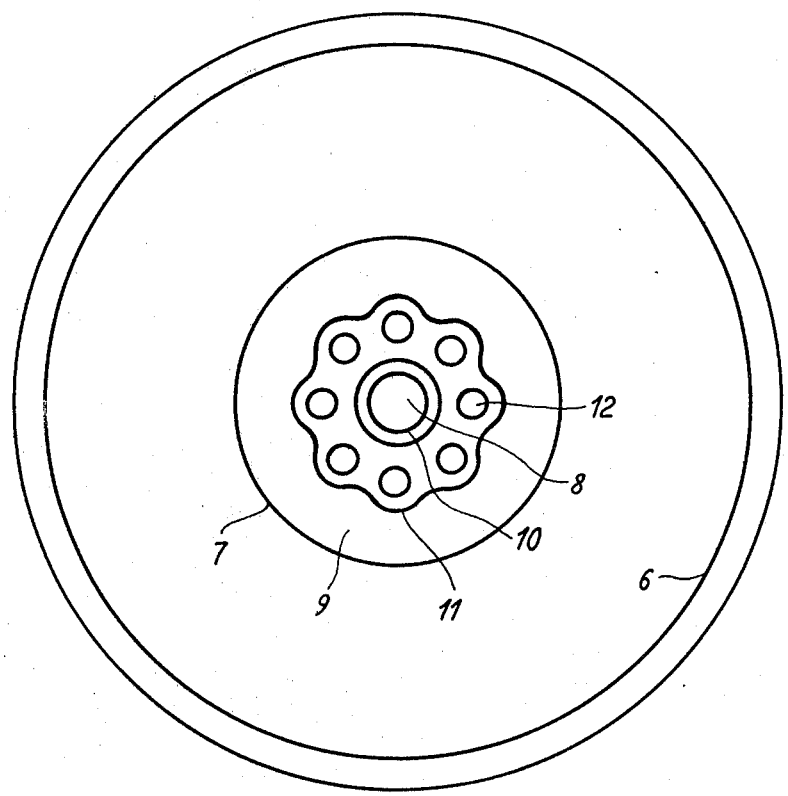
FIG. 2 illustrates a disk to be placed in this cartridge.

Such a magnet can attract a disk only if the latter possesses magnetic properties. For this purpose, a conventional flexible video-disk has been modified in the manner illustrated in FIG. 2. This disk, viewed from the non-recorded side, includes a recorded zone, seen by transparency and delimited by the circles 6 and 7, and a central hole 8 designed to admit the rotary spindle of the reader. A label 9 including a central hole 10 whose diameter is slightly larger than the hole 8 and whose outer edge 11 is cut to an undulating shape, is adhered to the non-recorded face. This label can bear an inscription and serves as a support for a group of magnetic patches 12. Thus, when the disk is placed in cavity 3 of the tray, with its non-recorded face turned towards the surface of this cavity, the magnet 5 attracts the patches 12 and maintains the centre of the disk applied against this surface, consequently immobilising it. The result is, in the first place, that the non-recorded face can now only touch the bottom of the cartridge without having any relative movement in relation thereto, which considerably minimizes the risks of damage due to this contact and, in particular, eliminates the risks of scratching. Then, when the cartridge is turned over in such a way that the opening of cavity 3 is pointing downwards as shown in FIG. 4, the disk tends to fall back with its recorded face towards the sleeve and, since it is held in place by its centre, it curves forming a bell shape, with the result that it touches this sleeve only along a circular band delimited by its external perimeter and whose width depends on the weight of the disk, its rigidity, and the depth of cavity 3. Using conventional disks, it is easy to obtain for a very shallow cavity depth a supporting band width that is sufficiently small to prevent the recorded part from touching the bottom of the cavity. The recorded face cannot, therefore, touch the sleeve and thus runs no risk of being damaged by such a contact.

Moreover, it is not conceivable that, as a result of impact, the disk could curve to the extent of touching the sleeve or become detached from the magnetized ring. Indeed, in view of the low weight of the disk, a shock liable to produce such a result would be so violent that the cartridge, and probably the disk as well, would be damaged thereby, and any scratching would be negligible in relation to the other damage.

The label used in this way is a convenient means for fixing the group of patches on the disk in a single operation without any lengthy and difficult positioning work. For the same reason, hole 10 is larger in diameter than hole 8 and the outer edge of the label is cut as described, since it makes it easy to locate the patches. These details of design are in no way essential and can be omitted, or different, for example in the case of automated mass production, in which case the patches can, for example, even be directly adhered to the disk, although the label is accessorily useful in that it can bear identification markings.

Figure 3:
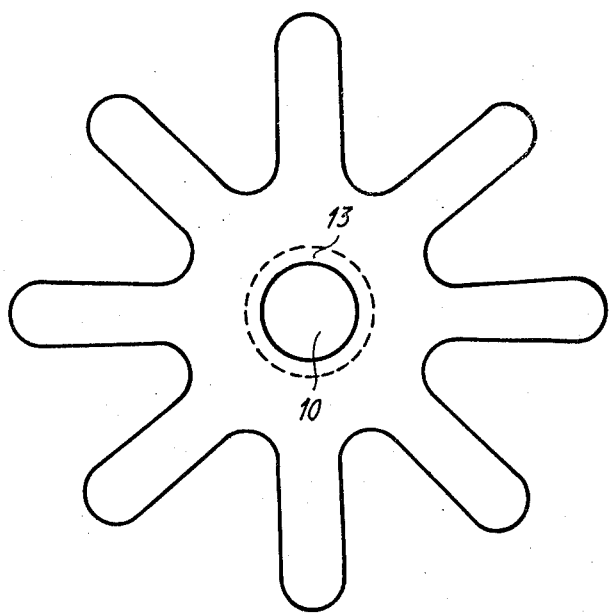
FIG. 3 illustrates a fixing part designed to be glued to a video-disk.

In addition, in order to restrict the reduction in flexibility of the central portion of the disk, use can be made of a thin sheet of steel cut to the shape of a long-pointed star such as that in FIG. 3 and glued to the disk along a narrow band 13 close to the edges of central hole 10.

In one form of embodiment of the invention, use has been made of a conventional video-disk of PVC with a thickness of 15/100 mm and a diameter of 300 mm, pierced by a central hole with a diameter of 15 mm and recorded on one face between two circles with diameters of 296 mm and 120 mm. A label such as that in FIG. 2, pierced by a central hole with a diameter of 20 mm and having 10 steel patches with a diameter of 10 mm and a thickness of 0.06 mm uniformly distributed over a circle with a diameter of 90 mm, has been stuck to this disk. This label, provided with the patches, weighed approximately 5 g.

The tray of polyamide 6.6 comprises a cavity designed to receive the disk and with a diameter comprised between 300.5 and 300.2 mm, 4.5 mm deep and with edges sloping at an angle of 15°; it is provided with a multipolar magnet with an outside diameter of 100 mm and an inside diameter of 80 mm, 1 mm thick and placed in a groove such that it projected 0.2 mm from the surface of the cavity.

The paper-backed cardboard sleeve is slightly curved so that the lips do not come together when the tray is out and in order to grip the tray so as to give an effort of extraction varying between 1 kg when extraction begins and approximately ½ kg when it is about ⅔ out.

The invention applied to any embodiment of the means enabling the central portion of the disk to be caused to adhere to the tray, in particular to permanent charging of a ring enabling use to be made of electrostatic attraction.

What we claim is:

1. In combination: a flexible video disc having a magnetic means centrally located thereon and a recorded face; and a cartridge for enclosing said flexible videodisc said cartridge comprising:
   a sleeve; and
   a tray for being placed into said sleeve; said tray having a cavity having a bottom surface for containing said video-disc with its recorded face facing away from said bottom surface, said tray including means for magnetically attracting said centrally located magnetic means to maintain the center of said disk immobile in said cavity, said cavity having a depth which exceeds the thickness of said video disc by such an amount that when said tray is placed into said sleeve, in a position with said bottom surface of said cavity facing downward so that said bottom surface of said cavity is above said disc, said disc forms a bell shape to touch said sleeve only along a circular band delimited by its external perimeter so that said recorded face cannot touch said sleeve.

2. In combination as claimed in claim 1, wherein said cavity is circular, and said attracting means are distributed over a circular band concentric to said cavity.

3. In combination as claimed in claim 2, wherein said attracting means comprise a multi-polar magnet having the shape of a flat ring.

4. In combination as claimed in claim 3, wherein said tray has a groove hollowed in the bottom of said cavity for housing said magnet; the depth of said groove being designed for having said magnet slightly projecting from said bottom whereby the video-disc always comes into contact with the magnet.

5. In combination as claimed in claim 1, wherein said magnetic means comprises at least a magnetic member placed on a central portion of the video-disc.

6. In combination as claimed in claim 5 wherein said magnetic means comprises a plurality of metallic magnetic patches distributed over a circle concentric to the video-disc.

7. In combination as claimed in claim 6, wherein said patches are glued to said video-disc.

8. In combination as claimed in claim 6 further comprising a central label glued to said video-disc, and wherein said patches are glued to said label.

9. In combination as claimed in claim 5, wherein said magnetic member is shaped as a long-pointed star having a central hole, concentric to the video-disc, and glued to the video-disc along the periphery of said central hole.

* * * * *